United States Patent [19]

Garner

[11] 4,260,203
[45] Apr. 7, 1981

[54] BEARING STRUCTURE FOR A ROTARY ROCK BIT

[75] Inventor: Lloyd L. Garner, Dana Point, Calif.

[73] Assignee: Smith International, Inc., Newport Beach, Calif.

[21] Appl. No.: 73,751

[22] Filed: Sep. 10, 1979

Related U.S. Application Data

[63] Continuation-in-part of Ser. No. 919,263, Jun. 26, 1978, abandoned.

[51] Int. Cl.³ .............................................. F16C 33/12
[52] U.S. Cl. ................................. 308/8.2; 308/DIG. 8
[58] Field of Search ................. 308/8.2, DIG. 8, 158, 308/159; 175/371, 329, 372

[56] References Cited

U.S. PATENT DOCUMENTS

| | | | |
|---|---|---|---|
| 1,975,646 | 10/1934 | Lüthy | 308/159 |
| 2,823,083 | 2/1958 | Welton et al. | 308/8.2 |
| 3,095,053 | 6/1963 | Pistole et al. | 175/329 |
| 4,145,094 | 3/1979 | Vezirian | 308/8.2 |

Primary Examiner—Lenard A. Footland
Attorney, Agent, or Firm—Robert G. Upton

[57] ABSTRACT

A rotary rock bit is disclosed having bearing surfaces utilized therein which have extremely long wear resistant properties. The rock bit comprises a plurality of legs extending downwardly from a main bit body. A cone cutter is rotatively mounted on a journal formed on each leg. One or more of the interengaging bearing surfaces between the cone and the journal includes a layer of diamond material mounted on a substrate of carbide. In one embodiment, the bearing material forms the thrust button adjacent the spindle located at the end of the journal. In another embodiment, the bearing material is located on the interengaging axial faces of the journal and cone. In still another embodiment, the bearing material is a segmented cylindrical bearing located in a circumferential groove formed in the journal.

7 Claims, 12 Drawing Figures

BEARING STRUCTURE FOR A ROTARY ROCK BIT

CROSS-REFERENCE TO RELATED APPLICATION

This application is a continuation-in-part of application Ser. No. 919,263, filed June 26, 1978, abandoned 1. Field of the Invention The invention relates generally to rotary rock bits and, more particularly, to bearing structures found therein. 2. Description of the Prior Art A rotary rock bit generally consists of a main bit body adapted to be connected to a rotary drill string. A conventional bit usually includes two or more legs integrally connected with each leg assembly including a cutter rotatively mounted on a journal pin extending from the leg. Bearing assemblies are provided between the interengaging surfaces of each cutter and journal pin to promote rotation of the cutter. Finally, means are provided on the outer surface of the cutter for disintegrating the formation as the bit and cutter is rotatively advanced in a borehole.

The various types of bearing assemblies utilized in rock bits include roller bearings, ball bearings and different types of friction bearings. Present day premium bits usually incorporate a number of friction bearings in their assemblies. Such friction bearings can be located on all of the radial and axial interengaging surfaces of the cone interior and the journal. Such surfaces are usually machined and also carburized to enhance wear capabilities. Before carburizing these bearing surfaces, the rest of the leg surface must be painted over to prevent the remaining surfaces from being carburized. Besides being a cumbersome operation, carbon leakage can occur on the painted surfaces, which is deleterious to subsequent operations on the legs.

Moreover, conventional premium bits utilize a thrust button positioned at the end of the spindle to absorb axial loads. Such thrust buttons are usually made of tool steel and work well enough for present day applications. However, these thrust buttons do not wear well thereby cutting down on the useful life of the cutting structure.

Hardfacing of bearing surfaces for friction bearing rock bits is relatively commonplace in the rock bit industry. Since much of the journal wear occurs on the load bearing side of the journal, the remaining bearing surface need not be metallurgically hardfaced. A hardfacing alloy is normally applied to a circumferential groove in the journal with a welding torch. Nickel or cobalt base alloy, for example, is built up on the load side of the bearing, then ground and polished to the cone journal bearing interface tolerances. This method is time consuming and subjects the journal to unequal heat stresses because of the application of hardfacing material to only one side of the cylindrical journal bearing.

An example of this type of hardfacing is taught in U.S. Pat. No. 4,061,376, assigned to the same assignee of the present invention. This invention describes a rock bit having a rotary cutter cone journaled on a fixed journal bearing shaft with the radial load being taken by a cylindrical journal bearing. The friction bearing portion of the fixed shaft has a groove extending around the periphery of the shaft. The groove is filled with a bearing metal over an arc on the lower load bearing friction of the shaft. The remaining unfilled portion of the groove is connected through a lubricant supply passage in the bit body with a pressure-compensated grease reservoir in the bit body, to supply lubrication to the journal bearing.

SUMMARY OF THE INVENTION

The present invention obviates the above-mentioned shortcomings by providing a novel bearing structure which is utilized on some or all of the interengaging surfaces of the cone and journal.

In its broadest aspect, the present invention pertains to a rotary rock bit comprising a main bit body having a plurality of legs extending downwardly therefrom. Each leg includes a journal formed thereon having a plurality of axial and cylindrical bearing surfaces. A cone having a plurality of cutting elements located on the exterior surface thereof is rotatively mounted on each journal with each cone having a plurality of internal axial and cylindrical bearing surfaces opposite to and engaging the bearing surfaces of the respective journal. At least a portion of these bearing surfaces are formed by a layer of diamond material mounted on a carbide substrate which, in turn, is bonded to the base metal of the cone or journal.

A primary advantage of the present invention is that the novel bearing material has extremely good wear resistant properties thereby increasing the operating life of the cutting structure.

Another object of the present invention is that the novel bearing structure is especially suitable to be utilized as a thrust button located on the end of the journal, thereby greatly increasing the wear life thereof.

Yet another object of the present invention is the substitution of a segmented ring for the hardfacing alloy metallurgically applied to the load side of the journal bearing. The segmented ring is placed within an annular groove formed by the journal bearing that normally would receive the application of the hardfacing material.

Still another object of the present invention is that by utilizing the novel bearing structure on all of the axial and radial interengaging surfaces, the need for carburization of the bit is somewhat reduced.

The features of the present invention, which are believed to be novel, are set forth in detail in the appended claims. The present invention, both as to its organization and manner of operation, together with the further advantages thereof, may best be understood by reference to the following description taken in connection with the accompanying drawings.

DESCRIPTION OF THE PREFERRED EMBODIMENTS AND BEST MODE FOR CARRYING OUT THE INVENTION

Figure 1:
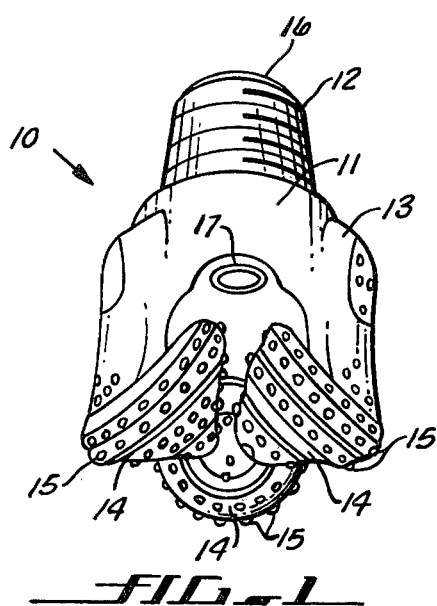
FIG. 1 is a perspective view of a rotary rock bit.

Referring now to the drawings, FIG. 1 illustrates a three cone rotary rock bit, although the invention can be utilized in other types of rock bits. The rotary rock bit, generally indicated by arrow 10, comprises a bit body 11 having an upper threaded portion 12 for connection to the lower end of a rotary drill string (not shown). Extending downwardly from the bit body 11 are three substantially identical legs 13. The lower end of each of the legs is provided with an extended journal pin, details of which will be discussed hereinafter.

A rotary cone cutter 14 is rotatively positioned on each journal pin of a respective leg 13. Each cone cutter 14 includes a cutting structure 15 on its outer face which is adapted to disintegrate the formations as the bit is rotated and moved downward. The cutting structure 15 is shown in the form of tungsten carbide inserts, however, it is to be understood that other cutting structures such as milled steel teeth formed on the cone cutters may be utilized.

The bit 10 further includes a central passageway 16 extending along the center axis of body 11 to allow drilling fluid to enter from the upper section of the drill string immediately above and pass downward through three jet nozzles 17, one of which is shown in FIG. 1.

In operation, the drill bit 10 is connected as a lower member of a rotary drill string (not shown) and lowered into a well bore until the rotatable cone cutter 14 engages the bottom of the well bore. Upon engagement with the bottom well bore the drill string is rotated, rotating bit 10 therewith. Drilling fluid is forced down through the interior passage of the rotary drill string and continues through the central passageway 16 of the bit 10, passing through the three nozzles 17, past the cutting structure 15 of the cutter 14 to the bottom of the well bore, and then upwardly into the annulus between the rotary drill string and the wall of the well bore carrying with it the cuttings and debris from the drilling operations.

Figure 2:
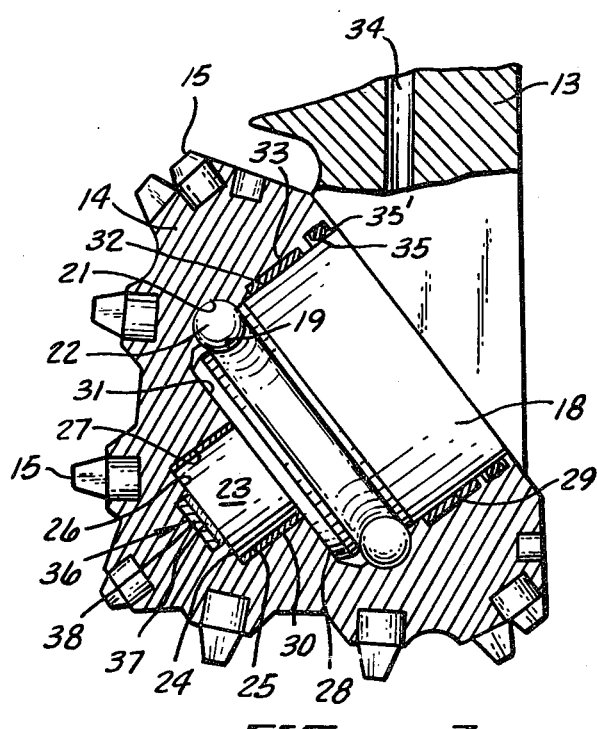
FIG. 2 is a fragmentary sectional view of one of the rock bit legs illustrating one embodiment of the present invention.

Referring now to FIG. 2, one leg 13 of the rotary rock bit is shown. The cone cutter 14 is rotatively mounted on a journal pin 18 extending out of the leg 13. The journal 18 includes a ball race 19 which registers with a ball race 21 formed in the cutter 14 for receiving a plurality of ball bearings 22. Besides functioning as a bearing structure, the ball bearings 22 also function as a means for retaining the cone 14 on the journal 18.

The journal 18 also includes a spindle 23 formed on the outer extremity thereof. The spindle includes an axial face 24 and a cylindrical face 25. These spindle faces 24 and 25 are adapted to engage the opposed axial and cylindrical faces 26 and 27, respectively, of the cutter 14. A quantity of hardfacing 30 may be applied to either of the cylindrical surfaces 25 or 27.

The journal 18 further includes an axial face 28 and a cylindrical face 29 which are adapted to oppose and engage an axial face 31 and a cylindrical face 32 formed in the cutter. The above-mentioned interengaging axial and cylindrical surfaces of the journal 18 and cutter 14 form the bearing surfaces for the friction bearing assemblies. In the first embodiment, a quantity of conventional hardfacing 33 may be formed within the cutter cylindrical face 32.

A lubricant passageway 34 is formed in the leg assembly and communicates with a lubricant reservoir (not shown) formed in the upper part of the leg. Although not shown, the lubricant passageway 34 extends downwardly into the journal 18 to communicate with the bearing areas between the cutter 14 and journal 18. An elastomeric annular seal 35 is provided with a channel 35¹ formed at the base of the cutter 14 to prevent the lubricant from passing from the bearing area to the exterior of the rotary rock bit. The seal 35 also functions to prevent drilling fluid or debris from entering from the bit exterior into the bearing area of each leg assembly.

The interior apex of the cone 14 further includes an annular recess for receiving a thrust button, generally indicated by arrow 36. The thrust button is comprised of a layer of diamond material 37 bonded to a carbide substrate 38 which, in turn, is bonded to the base metal of the cutter 14. Such bonding can be through any conventional means such as furnace brazing.

The diamond material 37 is preferably a synthetic material such as that developed by General Electric and commercially available under their trademark STRATAPAX.

Figure 3:
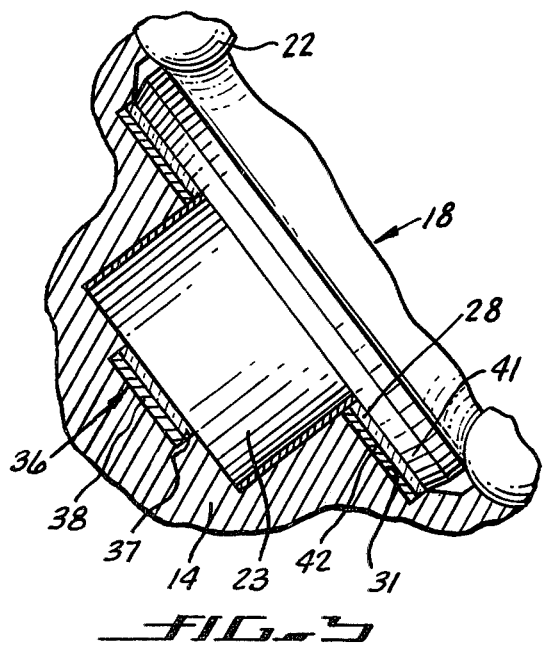
FIG. 3 is an enlarged fragmentary sectional view of a second embodiment of the present invention.

Referring now to FIG. 3, a second embodiment of the present invention is illustrated in which not only is a thrust button 36, similar to that shown in FIG. 2, utilized, but the axial face 31 of the cutter also has a bearing surface formed thereon comprised of a diamond material 41 mounted on a carbide substrate 42. Again, the carbide substrate 42 is bonded to the axial face 31 of the cutter 14 by any conventional bonding means such as furnace brazing. The diamond material 41 then frictionally engages the axial face 28 of the journal 18.

Figure 4:
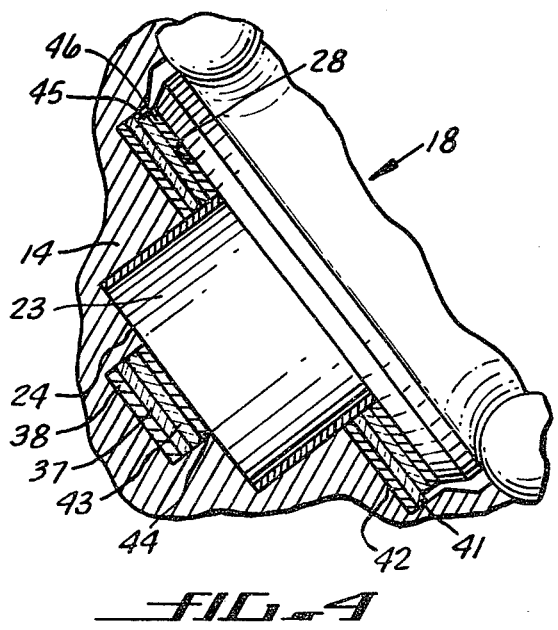
FIG. 4 is an enlarged fragmentary sectional view of a third embodiment of the present invention.

FIG. 4 illustrates a third embodiment of the present invention in which the bearing structure which is formed on the cone frictionally engages similar bearing structures which are bonded to the journal 18. These bearing structures are in the form of a diamond disc 43 mounted on a carbide substrate 44 which, in turn, is bonded to the axial face 24 of the spindle 23.

An annular diamond plate 45 is also provided and is mounted on an annular carbide substrate 46 which, in turn, is bonded to the axial face 28 of the journal 18. In this embodiment, the diamond bearing surfaces 37 and 41 formed on the cutter 14 function to frictionally engage the diamond bearing surfaces 43 and 45 formed on the journal 18 as the rock bit is rotated.

As mentioned above, the rotary rock bit, described in FIG. 2, is a sealed bearing bit. It should also be noted that the present invention can also be utilized in open bearing bits such as that described in FIG. 5. Such bits are normally air cooled and the passageway 47 is provided to extend through the journal to communicate with the bearing areas to enable air to pass therethrough. It should also be noted that the seal 34 in the leg assembly described in FIG. 2 is absent in the leg assembly shown in FIG. 5.

Figure 5:
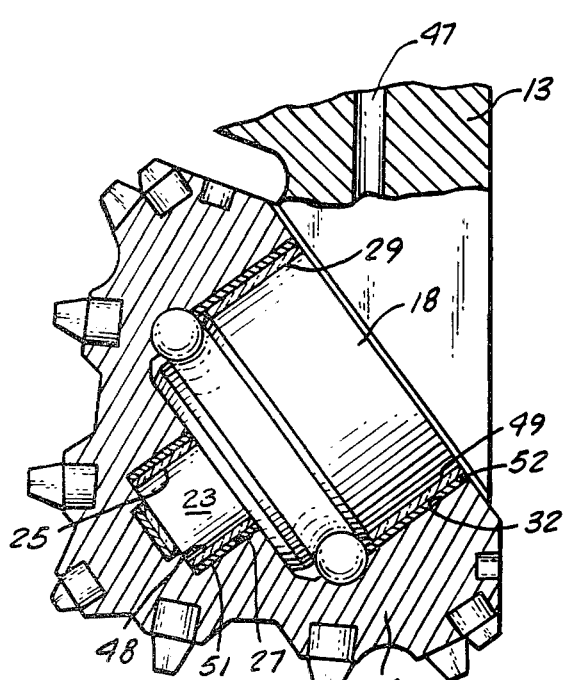
FIG. 5 is a fragmentary sectional view of a rock bit leg illustrating a fourth embodiment of the present invention.

In the embodiment shown in FIG. 5, the cylindrical faces 27 and 32 of the cutter 14 have a cylindrical bearing structure formed thereon which comprise a cylindrical layer of diamond material 48 and 49 mounted on cylindrical carbide substrates 51 and 52, respectively. During rotation, the cylindrical diamond bearings 48 and 49 function to frictionally engage the cylindrical face 25 of the spindle 23 and the cylindrical face 29 of the journal 18.

Figure 6:
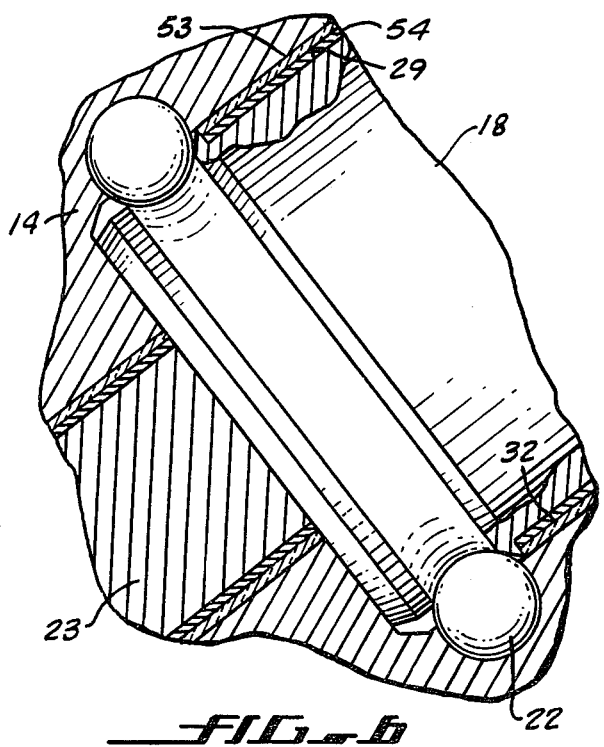
FIG. 6 is an enlarged sectional view of the spindle area of the leg assembly shown in FIG. 5.

In the embodiment shown in FIG. 6, a cylindrical diamond sleeve 53 is mounted on a cylindrical carbide substrate 54 which, in turn, is bonded to the cylindrical face 29 of the journal 18. In this embodiment, the diamond sleeve 53 frictionally engages the cylindrical surface 32 of the cutter 14.

Figure 7:
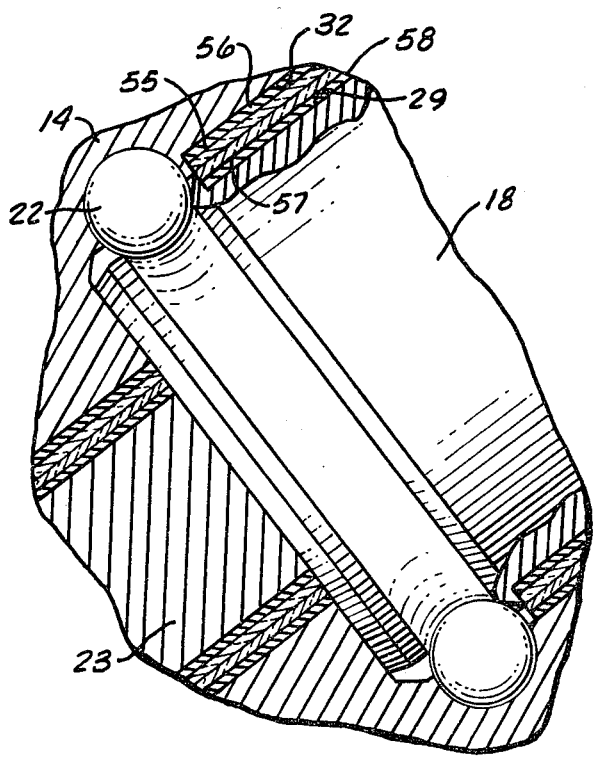
FIG. 7 is an enlarged sectional view of a fifth embodiment of the present invention.

In the embodiment shown in FIG. 7, a cylindrical diamond sleeve 55 is mounted on a cylindrical carbide substrate 56 which, in turn, is bonded to the cylindrical face 32 of the cutter 14. This diamond sleeve 55 frictionally engages a diamond sleeve 57 which is mounted on a carbide substrate 58 bonded to the cylindrical face 29 of the journal 18.

Figure 8:
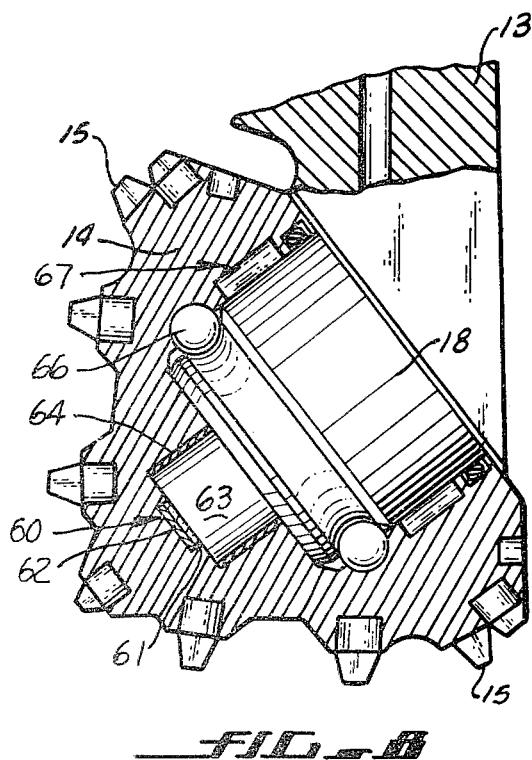
FIG. 8 is a view of the present invention in a roller bearing bit.

In the embodiment shown in FIG. 8, a thrust button 60 is pressed into the cone 14 to resist the majority of the thrust loading. The thrust button 60 again comprises a diamond disc 61 mounted on a carbide substrate 62, with the diamond disc 61 riding or rotating against the end of the hardfaced pilot pin or spindle 63. In the present embodiment, the thrust button 60 is used in a rock bit having a roller-ball-friction bearing system. In such a system, a friction bearing 64 is utilized on the spindle 63; a ball bearing assembly 66 is utilized to resist some of the thrust or longitudinal loading; and a roller bearing assembly 67 is utilized as the outer bearing to cooperate with the friction bearing 64 to support the radial loads acting thereon.

Figure 9:
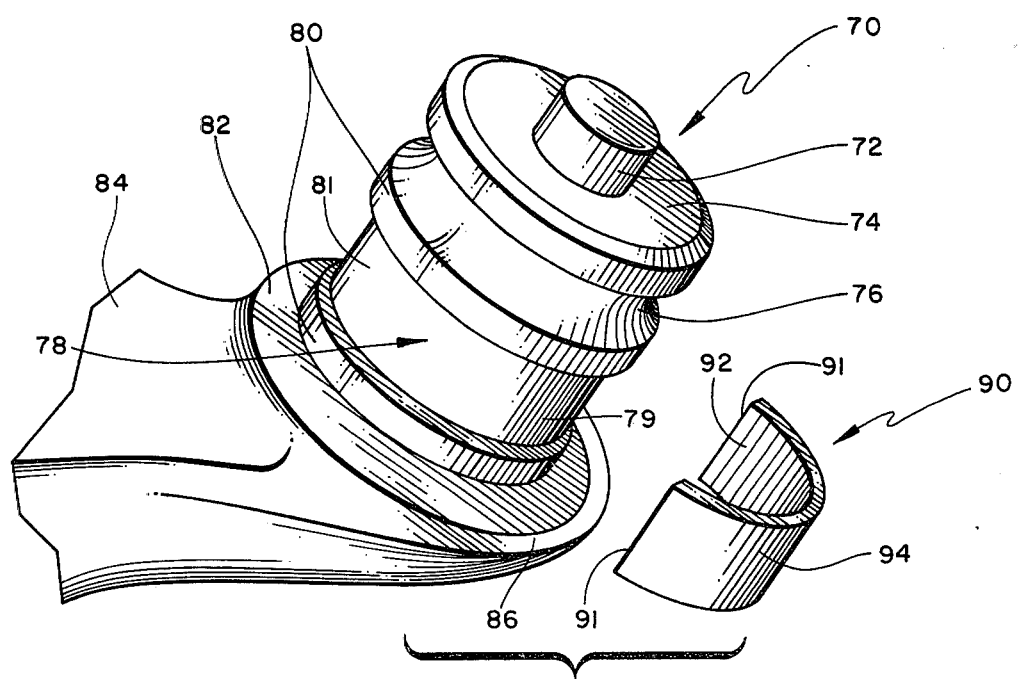
FIG. 9 is a perspective view of a journal bearing with an exploded segmented bearing extending from the lower, loaded side of the journal bearing.

With reference to FIG. 9, the perspective view depicts a journal bearing, generally designated as 70, extended from the end of leg 84 that has been machined with an annular bearing groove or slot 78 in the journal. The lower bearing load side 79 of groove 78 would normally have a hardfacing material such as nickel or cobalt base alloy metallurgically deposited therein as heretofore described. Excess bearing metal in the groove 78 is then ground or otherwise machined off flush with the cylindrical portion of the journal bearing 70. This embodiment of the present invention proposes to replace the metallurgically applied alloy with a segment of a cylindrical ring, generally designated as 90. The ring segment 94 could be held in position on the load side 79 of groove 78 by welding the ends 91 of ring 94 into the groove 78. The remaining portion of groove 78 around the unloaded end 81 of the groove serves as a lubrication reservoir in the same manner as that taught in U.S. Pat. No. 4,061,376. The ring segment 90 may be comprised of a hardened bearing material such as nickel or cobalt based material or the ring could comprise of a cylindrical carbide substrate material and have its outside surface 94 deposited with the diamond material as heretofore described with respect to FIGS. 1 through 8.

Figure 10:
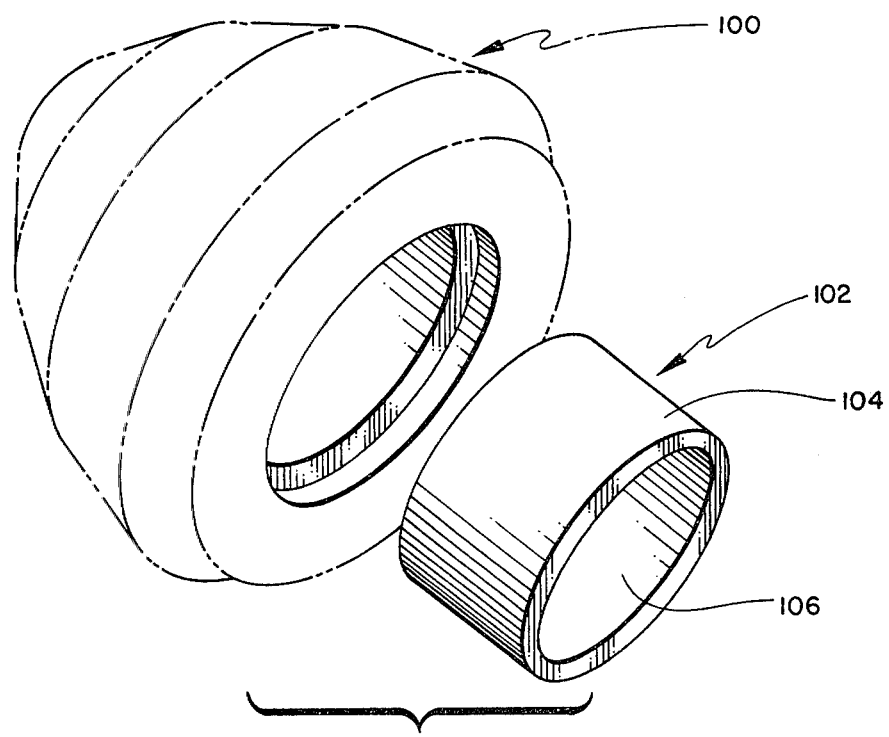
FIG. 10 is a perspective view in phantom line of a cutter cone with a cylindrical bearing ring exploded from the interior bore of the cone.

Referring now to FIG. 10, the cone, generally designated as 100 (depicted in phantom line) could have a cylindrical sleeve, generally designated as 102, having its outer surface 104 comprised of a carbide substrate material with, for example, a diamond deposit layer on the inner surface 106 to mate with the diamond deposit layer on the outer surface 94 of ring segment 90. The ring 102 is then, for example, pressed into the annular cavity bore formed by the cone 100.

Figure 11:
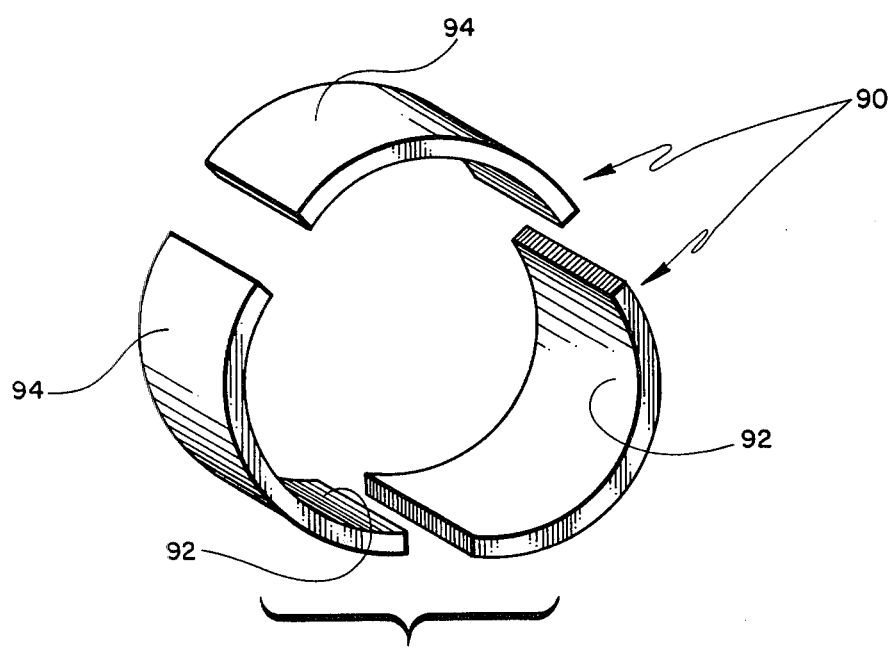
FIG. 11 is an exploded perspective view of a cylindrical bearing with 120° segments.

Turning now to FIG. 11, the cylindrical ring 90 may be divided into 120° segments, a third of which could be inlaid into the load side 79 of groove 78 of journal 70. It would, however, be obvious to divide a diamond-coated cylinder into thirds and the entire circumference defined by annular groove 78 may be filled in with the segmented ring 90. It would be further obvious to divide the cylindrical ring into halves or quarters. In a preferred embodiment one 180° ring segment would be inlaid within groove 78 formed in journal 70 in the lower load bearing portion 79 of groove 78 as shown in FIG. 9.

Figure 12:
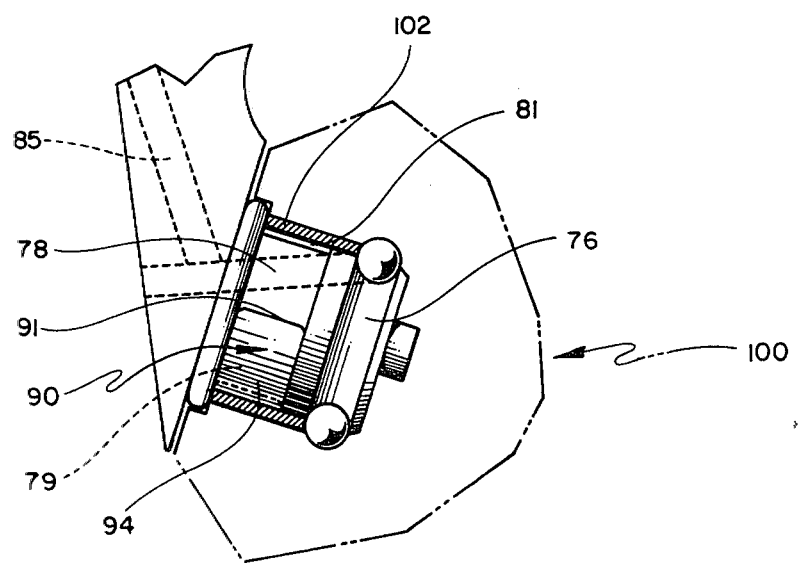
FIG. 12 is a partially cutaway side elevational view of the segmented ring positioned on the load side of the friction journal bearing.

The side elevation of FIG. 12 further illustrates the relationship of the ring segment 90 positioned in the loaded side 79 of groove 78. The ends 91 of segmented ring 90 may be welded to the groove segment 78 or the groove may have a ridge or ledge milled into the groove (not shown) so that the segment 90 is keyed into position preventing it from rotating within the groove 78. The ring segment would then stay in position without benefit of welding the ends 91 within the groove 78. The view of FIG. 12 clearly indicates the lubricant space around the upper half or two-thirds of the groove 78 depicted by area 81 to provide a reservoir of lubricant for the journal bearing. FIG. 12 further shows a primary lubricant path 85 that directs lubricant from a primary lubricant reservoir in the bit (not shown).

The primary advantage of utilizing a segmented ring in place of a metallurgically applied deposit of a hardfacing alloy is elimination of the unequal heat stresses imposed on the journal bearing 70 during the alloy deposit process. The use of the segmented bearing ring simplifies and expedites the bit fabrication process. In addition, conventional rock bits need not be modified to accept any unusual hardfacing or bearing surfaces. The segmented ring with, for example, diamond coatings may be inserted within the groove 78 and mated within a similarly coated cylindrical sleeve in the cone with very little modification to existing rock bits.

As can be seen by the various embodiments of the present invention, the bearing structure formed by a layer of diamond material mounted on a carbide substrate can be utilized in any or all of the axial and radial interengaging surfaces of the cutter 14 and journal 18.

It will of course be realized that various modifications can be made in the design and operation of the present invention without departing from the spirit thereof. Thus, while the principal preferred construction, and mode of operation of the invention have been explained in what is now considered to represent its best embodiments has been illustrated and described, it should be understood that within the scope of the appended claims, the invention may be practiced otherwise than as specifically illustrated and described.

I claim:
1. A rotary rock bit comprising:
a main bit body having at least one leg extending downwardly therefrom, each leg having a journal formed thereon having a plurality of axial and cylindrical surfaces;
a cutter cone rotatively mounted on each journal, each cone having a plurality of axial and cylindrical surfaces opposing respective axial and cylindrical surfaces formed by said journal, said journal having a circumferential groove formed in said cylindrical surface of said journal bearing; and a segmented annular bearing ring is mated within said circumferential groove, the outside surface formed by said annular ring serves as a bearing surface comprising a layer of hardened bearing material, said hardened material is diamond material mounted on a substrate, said substrate being bonded to said segmented annular ring.

2. The combination of claim 1 wherein said segmented bearing ring is divided into three 120° segments.

3. The combination of claim 1 wherein said segmented bearing ring is divided into a pair of 180° segments.

4. The combination of claim 1 wherein at least one segment is mounted within said groove formed in said journal on the lower load bearing portion of said journal when said rock bit is rotated in a borehole.

5. The combination of claim 4 wherein the segment is one 180° segment mounted within the load bearing portion of said groove formed in said journal.

6. The combination of claim 5 wherein the respective ends formed by said 180° segment are bonded within said circumferential groove formed in said journal to assure said ring segment remains on said loaded side of said journal.

7. The combination of claim 6 wherein the respective ends formed by said 180° segment are metallurgically bonded within said circumferential groove formed in said journal.

* * * * *